April 13, 1954 M. G. HARKER ET AL 2,675,469

INTEGRATING CIRCUIT ARRANGEMENT

Filed Feb. 17, 1948

Inventors:
Maurice Geoffrey Harker
John Bruce Smith
Peter Frederick Thomas Cryer Stillwell
By J. C. Oliver
Attorney Patented Apr. 13, 1954 2,675,469

UNITED STATES PATENT OFFICE 2,675,469

INTEGRATING CIRCUIT ARRANGEMENT

Maurice Geoffrey Harker, Pinner, John Bruce Smith, Ealing, London, and Peter Frederic Thomas Cryer Stillwell, Haddenham, Aylesbury, England, assignors to Electric & Musical Industries Limited, Hayes, England, a British company Application February 17, 1948, Serial No. 8,996

Claims priority, application Great Britain February 18, 1947

3 Claims. (Cl. 250—27)

This invention relates to integrating circuit arrangements.

Integrating circuits are known for the purpose of generating electrical waveforms such as sawtooth waveforms and waveforms which are suitable for the reduction of the so-called tilt and bend signals generated in television transmitter signals and for many other purposes.

It is known that in television transmitting systems employing certain types of camera tubes in which an electron beam scans a photo-sensitive mosaic, undesired signals corresponding to a gradual shading of the picture are produced as well as the desired signals. The unwanted signals are developed during the line and frame scanning periods, and are known to consist of irregular potentials which may be analysed into components repeating both at line and at frame frequencies which are (*a*) of sawtooth waveform and termed "tilt" signals, and (*b*) parabolic waveform known as "bend" signals. The effect of these unwanted signal components upon the received television picture can be overcome by inserting at the transmitter suitable correction signals which can effectively cancel the unwanted signals in such a manner that the wanted signals alone are transmitted.

In one method of producing the required correction signals, triggering pulses at line frequency, for example, such as are normally available at the transmitter, are employed to trigger a suitable linear-sawtooth generator, for instance, an integrating type of circuit as described in British Patent No. 580,527. The linear sawtooth signals thus produced are used as tilt-correction signals. The linear sawtooth voltages are then applied to a further integrator circuit which may also be of the aforesaid type and this in turn affords an output signal of parabolic shape which is employed as a bend-correction signal.

In generating such signals and other waveforms it is desirable to commence the integrating cycle at a particular value of potential. In some cases this potential may be required to be of a comparatively low value or in other cases it may be required to be of a comparatively high value.

The object of the present invention is to provide an improved integrating circuit arrangement which is of particular, although not of exclusive, use for the generation of waveforms such as are referred to above and in which the integrating cycle can be caused to commence at a desired value.

According to one feature of the invention there is provided an integrating circuit arrangement comprising a thermionic valve having at least a cathode, an input electrode and an output electrode, a source of potential, an impedance connecting said output electrode to said source of potential, an integrating capacity connected between said output electrode and said input electrode, a source of sawtooth potentials, means for feeding said sawtooth potentials to said input electrode to cause said valve to generate a parabolic waveform, a unidirectionally conducting device having one electrode conductively connected to said input electrode, and a source of pulses connected to another electrode of said device, said pulses having a polarity to render said device conducting at intervals to change the potential of said input electrode thereby to change the conducting condition of said valve to alter the potential of said output electrode, from which potential the potenial of said output electrode changes in opposite sense during integration.

In order that the said invention may be clearly understood and readily carried into effect, it will now be more fully described with reference to the accompanying drawings, in which.

In the several figures of the drawings like reference numerals are employed to indicate similar parts.

Figures 1, 2, 3, 4, 5, 6, 7, 8:
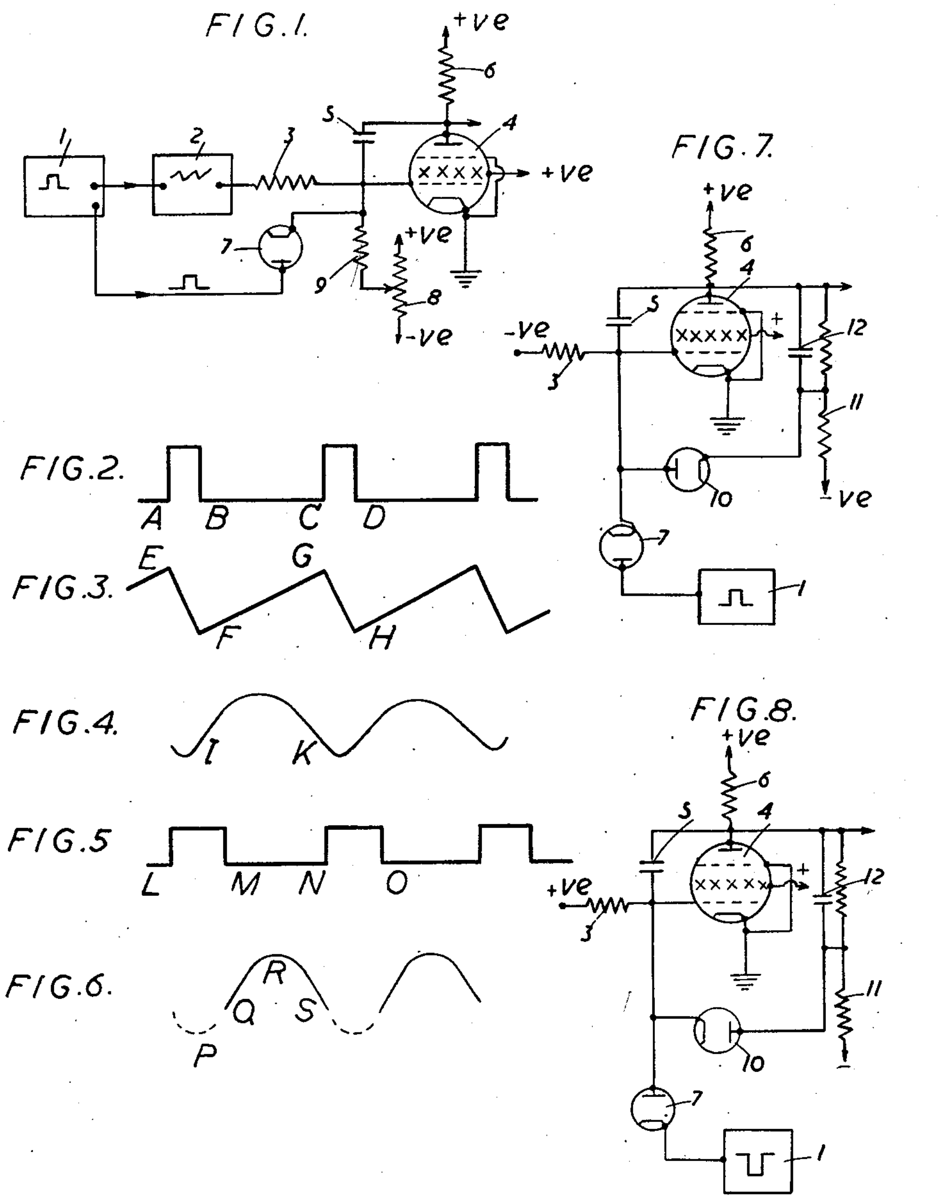
Figure 1 shows one embodiment of a circuit according to the invention by means of which symmetrical bend-correction signals can be produced.
Figures 2 to 6 illustrate various impulses and waveforms such as are employed or set up in the circuit shown in Figure 1.
Figure 7 illustrates a circuit arrangement according to a further embodiment of the invention.
Figure 8 illustrates another embodiment of the invention.

The circuit shown in Figure 1 will be described as applied to the generation of sawtooth and parabolic waveforms suitable for use in television transmitting systems. As shown in Figure 1, a pulse generator 1 is arranged to generate positive triggering impulses of the type shown in Figure 2 in which impulse durations AB,CD, are separated by relatively long periods such as BC. Said impulses, as will hereinafter be assumed, may constitute either the line or frame frequency trigger impulses set up at a television transmitter and are applied to and serve to trigger a linear sawtooth generator 2 which may be any suitable type but, in particular, may be of the kind described in British Patent No. 580,527, in which a constant potential is integrated during the periods between the impulses. The output from the generator 2 is thus of the form shown in Figure 3 in which the linear portion FG has a duration equal to a line or frame scanning period and may therefore be applied to the signal channel of the television transmitter in such a manner as to correct for "tilt."

The output from the generator 2 is applied to an integrating circuit according to British Patent No. 580,527 comprising the resistor 3 connected to the input or control electrode of valve 4 and a condenser 5 connected between the anode load resistor 6 and said control electrode. Owing to the degenerative feedback between the load resistor 6 and the control electrode of the valve 4 an accurate integration of the potential applied to the resistor 3 appears at the anode of the valve. The potential set up at the anode of the valve 4 is thus of parabolic waveform.

The impulses from the generator 1 are also applied to the anode of an unidirectionally conducting device shown as a diode 7 the cathode of which is connected to the control electrode of the valve 4, as shown. The positive pulses from the generator 1 serve to render said diode 7 conducting at intervals and as soon as said diode is rendered conducting the cathode potential of the diode increases and thus increases the potential of the control electrode of the valve 4 so that the anode potential of the valve 4 is caused to fall momentarily to its lowest operating value. This ensures that the waveform of potential set up at the anode of the valve 4 always commences at the same value I as indicated in Figure 4. The parabolic waveform so generated will not be symmetrical, however, unless the potential K (Figure 4) at the instant when integration ends is the same as the potential I at which it begins, and in order to control the symmetry of the potential waveform generated a constant potential derived from the potentiometer 8 is integrated by means of the integrating resistance 9 and the condenser 5 and valve 4 so as to generate a sawtooth component which serves to control the asymmetry of the parabolic waveform. By adjusting the slider of the potentiometer 8 the generated waveform can be made symmetrical or a desired degree of asymmetry can be introduced.

In some television transmitters blanking or suppression pulses shown diagrammatically in Figure 5 are applied to the amplifier of the television transmitter in order to suppress unwanted impulses which are produced in the camera in the intervals between trains of picture signals. The blanking impulses indicated at LM, NO are of longer duration than the impulses shown in Figure 2, so that the period MN during which picture signals are being amplified is less than the period IK during which the tilt and bend correction signals are generated. In such a case the bend-correction signals will require to be symmetrical during the period MN as indicated at QRS in Figure 6. By suitable adjustment of the potentiometer 8 an asymmetrical waveform PRS as shown in Figure 6 is set up at the anode of valve 4. Although the waveform PRS is asymmetrical with respect to the period BC of Figure 2 between the triggering impulses, the portion QRS is substantially symmetrical with respect to the period MN during which the picture signals are being transmitted.

In Figure 1 of the drawings, the potential at which the integrating cycle performed by the valve 4 commences is that corresponding to the lowest operating potential of the anode of valve 4. Such an arrangement may not be desirable in all cases owing to the momentary absence of gain of the valve 4 and according to a further embodiment of the invention as shown in Figure 7 a further unidirectionally conducting device is connected between the control electrode of the valve 4 and the anode of the valve and is so arranged that the fall of potential of the anode when the diode 7 is rendered conducting is arrested at a value somewhat higher than the lowest potential of the anode. Figure 7 of the drawings also illustrates the invention as applied to a generator of sawtooth waveforms. In this figure, the resistance 3 is connected, as shown, to a source of negative potential so that during the integrating cycle the potential of the anode of valve 4 rises. The cathode of the diode 7 is connected as in Figure 1 to the control electrode of the valve 4 whilst the cathode of the diode 7 is also connected to the anode of a further unilaterally conducting device, shown as a diode valve 10, the cathode of which is connected to a point on a potentiometer 11 connected between the anode of the valve 4 and a source of negative potential part of the potentiometer 11 being shunted by a condenser 12. The cathode of the diode 10 may, for example, be connected to a point on the potentiometer 11 which is substantially at earth potential and the arrangement is such that when the diode 7 is rendered conducting by positive pulses from the generator 1 the potential of the anode of valve 4 commences to fall until the diode 10 is rendered conducting when the fall of potential of the anode is arrested. For example, it may be arranged that the fall of potential is arrested when the anode of the valve reaches a potential of 100 volts so that at the commencement of the next integrating cycle sufficient gain is available in the valve 4 to prevent distortion of the initial part of the generated waveform.

Figure 8 of the drawings illustrates a circuit similar to that shown in Figure 7 but in which the connections of the diodes 7 and 10 are reversed and the diode 7 is rendered conducting on the application of negative pulses to its cathode. In this arrangement the resistance 3 is connected to a source of positive potential so that the control electrode of the valve 4 during the integrating cycle rises in potential and the potential of the anode of the valve 4 is thus caused to fall. When the diode 7 is rendered conducting on the application of a negative pulse to its cathode, the control electrode of the valve 4 is reduced in potential so causing the potential of the anode of valve 4 to rise until the diode 10 is rendered conducting when the rise of potential is arrested. In the circuit shown in Figure 8, therefore, the arrangement is such that the diode 10 serves to arrest a rise in potential of the anode of valve 4 which is in contra-distinction to the arrangement shown in Figure 7 in which the diode 10 serves to arrest a fall in potential of the anode of valve 4.

We claim:

1. An integrating circuit arrangement comprising a thermionic valve, an integrating capacity connected between an output electrode of said valve and an input electrode thereof, a unidirectionally conducting device connected to said input electrode, a source of pulses, means for feeding said pulses to said unidirectionally conducting device for rendering said device conducting at intervals to bring the potential of said output electrode to the same predetermined value for each integrating cycle, means for feeding to said integrating capacity a sawtooth variation to produce a parabolic waveform from said valve, and means for supplying to said integrating capacity a further potential for integration thereby, said means for supplying a further potential comprising a potentiometer for connection to a source of potential and having a tapping point, and a resistance in series with said capacity, said tapping point being connected to said resistance to integrate the potential derived from the tapping point together with said sawtooth variations.

2. An integrating circuit arrangement comprising a thermionic valve having at least a cathode, an input electrode and an output electrode, a source of potential, an impedance connecting said output electrode to said source of potential, an integrating capacity connected between said output electrode and said input electrode, a source of sawtooth potentials, means for feeding said sawtooth potentials to said input electrode to cause said valve to generate a parabolic waveform, a unidirectionally conducting device having one of its electrodes conductively connected to said input electrode, a source of pulses connected to another electrode of said device, said pulses having a polarity to render said device conducting at intervals to change the potential of said input electrode thereby to change the conducting condition of said valve to alter the potential of said output electrode from which potential the potential of said output electrode changes in opposite sense during integration.

3. An integrating circuit arrangement comprising a thermionic valve having at least a cathode, an input electrode and an output electrode, a source of potential, an impedance connecting said output electrode to said source of potential, an integrating capacity connected between said output electrode and said input electrode, a source of sawtooth potentials, means for feeding said sawtooth potentials to said input electrode to cause said valve to generate a parabolic waveform, a unidirectionally conducting device having one of its electrodes conductively connected to said input electrode, a source of pulses connected to another electrode of said device, said pulses having a polarity to render said device conducting at intervals to change the potential of said input electrode thereby to change the conducting condition of said valve to alter the potential of said output electrode, from which potential the potential of said output electrode changes in opposite sense during integration, a second source of potential, a potentiometer having a tapping point and connected to said second source of potential, and a resistance in series with said capacity, said tapping point being connected to said resistance to integrate the potential derived from said tapping point together with said sawtooth potentials.

References Cited in the file of this patent

UNITED STATES PATENTS

| Number | Name | Date |
|---|---|---|
| 2,412,485 | Whiteley | Dec. 10, 1946 |
| 2,494,865 | Flemming Williams et al. | Jan. 7, 1950 |
| 2,532,534 | Bell, Jr. | Dec. 5, 1950 |
| 2,555,837 | Williams | June 5, 1951 |
| 2,594,104 | Washburn | Apr. 22, 1952 |